(12) United States Patent
Chen et al.

(10) Patent No.: US 10,878,300 B2
(45) Date of Patent: Dec. 29, 2020

(54) ADJUSTING A COLOUR IN AN IMAGE

(71) Applicant: HP Indigo B.V., Amstelveen (NL)

(72) Inventors: Eli Chen, Ness Ziona (IL); Oren Haik, Ness Ziona (IL); Oded Perry, Ness Ziona (IL); Avi Malki, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/604,287

(22) PCT Filed: Sep. 26, 2017

(86) PCT No.: PCT/EP2017/074356
§ 371 (c)(1),
(2) Date: Oct. 10, 2019

(87) PCT Pub. No.: WO2019/063060
PCT Pub. Date: Apr. 4, 2019

(65) Prior Publication Data
US 2020/0210792 A1    Jul. 2, 2020

(51) Int. Cl.
*G06K 1/00* (2006.01)
*G06K 15/02* (2006.01)
*G06T 7/194* (2017.01)
*G06T 7/00* (2017.01)

(52) U.S. Cl.
CPC .......... *G06K 15/1878* (2013.01); *G06T 7/001* (2013.01); *G06T 7/194* (2017.01); *G06T 2207/10024* (2013.01)

(58) Field of Classification Search
None
See application file for complete search history.

(56) References Cited

U.S. PATENT DOCUMENTS

| 9,036,227 | B2 | 5/2015 | Maheshwari |
| 9,315,047 | B2 * | 4/2016 | Iton ........................ B41J 29/393 |
| 2003/0058467 | A1 | 3/2003 | Knox et al. |
| 2008/0289528 | A1 | 11/2008 | Pearson et al. |

(Continued)

FOREIGN PATENT DOCUMENTS

| CN | 105308237 A | 2/2016 |
| WO | WO-2002029393 A2 | 4/2002 |
| WO | WO-2013179276 | 12/2013 |

OTHER PUBLICATIONS

O'Gorman, Lawrence et al. "Document Image Analysis",1995, IEEE Computer Society Press, vol. 39. Los Alamitos:, 125 pages.

*Primary Examiner* — Dung D Tran
(74) *Attorney, Agent, or Firm* — Middleton Reutlinger

(57) ABSTRACT

A method for processing an image is disclosed. The method may include obtaining a target image to be printed using print agent in a printable area of a substrate of a particular colour. The method may include obtaining a scanned image of a substrate on which the target image has been printed, the substrate being of the particular colour. The method may include determining, from the scanned image, the particular colour of the substrate. The method may include using the target image as a reference image against which the scanned image is to be compared. The method may include adjusting a colour in the reference image according to the determined particular colour of the substrate. An apparatus and a machine-readable medium are also disclosed.

14 Claims, 5 Drawing Sheets

(56) References Cited

U.S. PATENT DOCUMENTS

| | | | |
|---|---|---|---|
| 2010/0123914 A1* | 5/2010 | Uwatoko | H04N 1/4072 |
| | | | 358/1.9 |
| 2010/0253957 A1 | 10/2010 | Sano et al. | |
| 2011/0058192 A1* | 3/2011 | Hatanaka | H04N 1/54 |
| | | | 358/1.9 |
| 2011/0149331 A1* | 6/2011 | Duggan | H04N 1/6047 |
| | | | 358/1.14 |
| 2012/0121139 A1* | 5/2012 | Kojima | B41F 33/0036 |
| | | | 382/112 |
| 2012/0147397 A1* | 6/2012 | Kawamoto | H04N 1/6033 |
| | | | 358/1.9 |
| 2014/0079292 A1 | 3/2014 | Kaneko et al. | |
| 2014/0348393 A1 | 11/2014 | Kogan | |
| 2015/0022832 A1 | 1/2015 | Choulet | |
| 2015/0172510 A1* | 6/2015 | Davidson | H04N 1/6094 |
| | | | 358/2.1 |
| 2016/0112604 A1 | 4/2016 | Bestmann | |
| 2016/0277644 A1* | 9/2016 | Fukase | H04N 1/6041 |

* cited by examiner

ADJUSTING A COLOUR IN AN IMAGE

BACKGROUND

A printing system may be used to print a target image on a substrate.

Defects in the printed image may be detected by comparing the target image with the printed image.

BRIEF DESCRIPTION OF DRAWINGS

Examples will now be described, by way of non-limiting example, with reference to the accompanying drawings, in which.

DETAILED DESCRIPTION

According to some examples, a printing system may print an image onto a printable medium, or substrate, by depositing print agent, or ink, from a nozzle or nozzles of a print agent distributor, or print head. The image to be printed onto the substrate may be referred to as a target image.

Print agent may be deposited, or delivered, onto the substrate one colour at a time, in individual layers referred to as separations. In some examples, four separations may be delivered onto a substrate to generate an image: a cyan (C) separation, a magenta (M) separation, a yellow (Y) separation and a black (K) separation. In some examples, such as when print agent is to be delivered into a non-white substrate, a white (W) separation may be delivered onto the substrate. When a target image is to be printed onto a non-white substrate, a white separation (or white print agent) may be delivered in regions where the colour white is to be shown. In some examples, a white separation may be delivered as a background separation, so that separations of other colours (e.g. CMYK) may be transferred on top of the white separation. In this way, the coloured (i.e. non-white) separations, such as C, M, Y and/or K may appear as though they had been printed onto a white substrate.

Print defects may occur, particularly when printing large numbers of substrates. A print defect may be an imperfection in the printed image, or a difference between the image that is printed and the image that is intended to be printed (i.e. the target image). A print defect in an image printed on a substrate may be detected by comparing the target image (i.e. the image intended to be printed) with the actual image printed onto the substrate.

Figure 1:
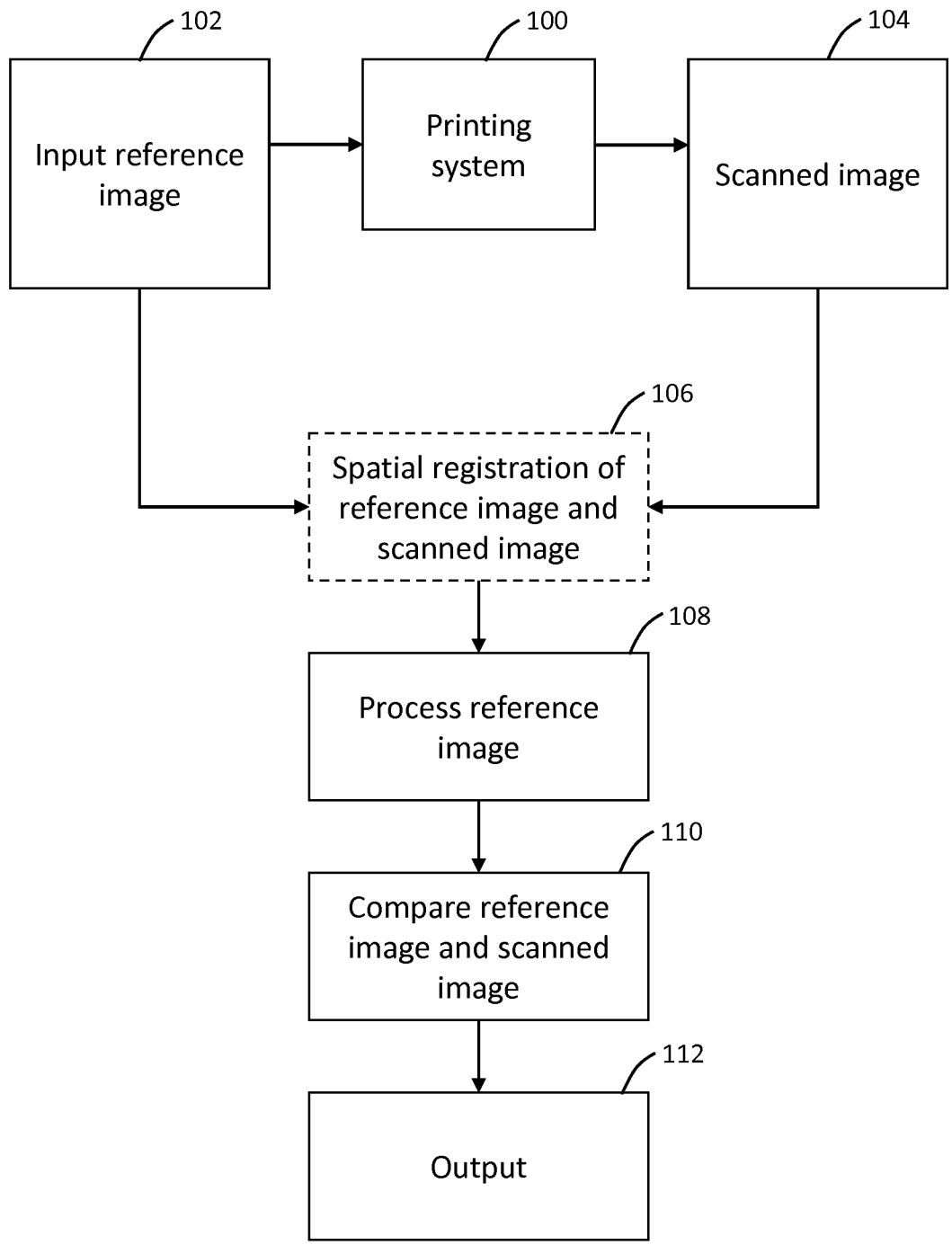
FIG. 1 is a simplified illustration of processes performed in relation to a printing system.

A printing system and a series of processes are shown schematically in FIG. 1. In FIG. 1, a printing system 100 is provided with an input reference image 102 to be printed onto a substrate. The input reference image 102 may, for example, be provided in the form of image data in an image file. The printing system 100 prints the reference image (i.e. the target image) onto a substrate, such as paper. The printed substrate may be scanned using a suitable scanning system which may, in some examples form part of the printing system 100. The scanning system generates, as its output, a scanned image 104 of the printed substrate. The scanned image 104 may be in the form of image data in an image file.

In order to determine whether or not the image printed onto the substrate contains any print defects, such as colour defects, areas which have not been printed correctly due to a nozzle blockage, debris on the substrate, or the like, the scanned image 104 of the printed substrate may be compared with the input reference image 102. Any differences between the scanned image 104 and the reference image 102 may be indicative of a print defect. If a print defect is detected, then it might be intended to temporarily prevent further substrates from being printed, or to take some other action to prevent further print defects from occurring.

In some examples, the reference image 102 and the scanned image 104 may be compared more accurately if the images are correctly aligned with one another. Thus, the reference image 102 and the scanned image 104 maybe spatially registered with one another, as indicated in block 106. Spatial registration 106 may, in some examples, not be performed and, as such, block 106 may be omitted, as indicated by the dashed lines.

If the substrate on which the reference image 102 is printed is white, then comparison of the reference image 102 and the scanned image 104 may be achieved without further processing of the reference image, since the reference image may be considered, or assumed, to be on a white background. In other words, any portions of the reference image 102 which do not correspond to areas in which print agent is to be delivered onto the substrate are considered to be white. Such portions may not contain any colour information. Thus, for a white substrate, the substrate colour is consistent with the background colour of the reference image 102. However, if the substrate on which the reference image 102 is printed is of a colour other that white, then a difference in colours will be identified in a comparison of the reference image and the scanned image 104. Such a colour difference may lead to a false indication of the presence of a print defect. Colour differences may result for various reasons. For example, a background colour of the reference image 102 (which assumed to be white) may be different to a background colour of the scanned image 104 (i.e. the colour of the substrate). In some examples, print agent of a particular colour may appear differently when printed on a non-white (i.e. coloured) substrate as compared to its colour when printed on a white substrate. Thus, an intended colour in the reference image 102 may appear a different colour when printed on a non-white substrate and, therefore, may appear a different colour in the scanned image 104.

Therefore, according to some examples, at block 108, processing may be performed to the reference image 102 prior to comparison with the scanned image 104, if the reference image is printed on a non-white substrate. The processing of block 108 is discussed in detail below.

At block 110, the reference image 102 and the scanned image 104 are compared, and any possible print defects are identified. Results of the comparison are output at block 112. The comparison results may be output in the form of an alert, such as a visual or audible signal delivered to a user, in the form of an indication on a display device that a print defect has been detected, and/or in the form of an action being taken, such as stopping further substrates from being printed until any issues causing the print defects have been resolved. In other examples, the results of the comparison may be output in some other form.

Figure 2:
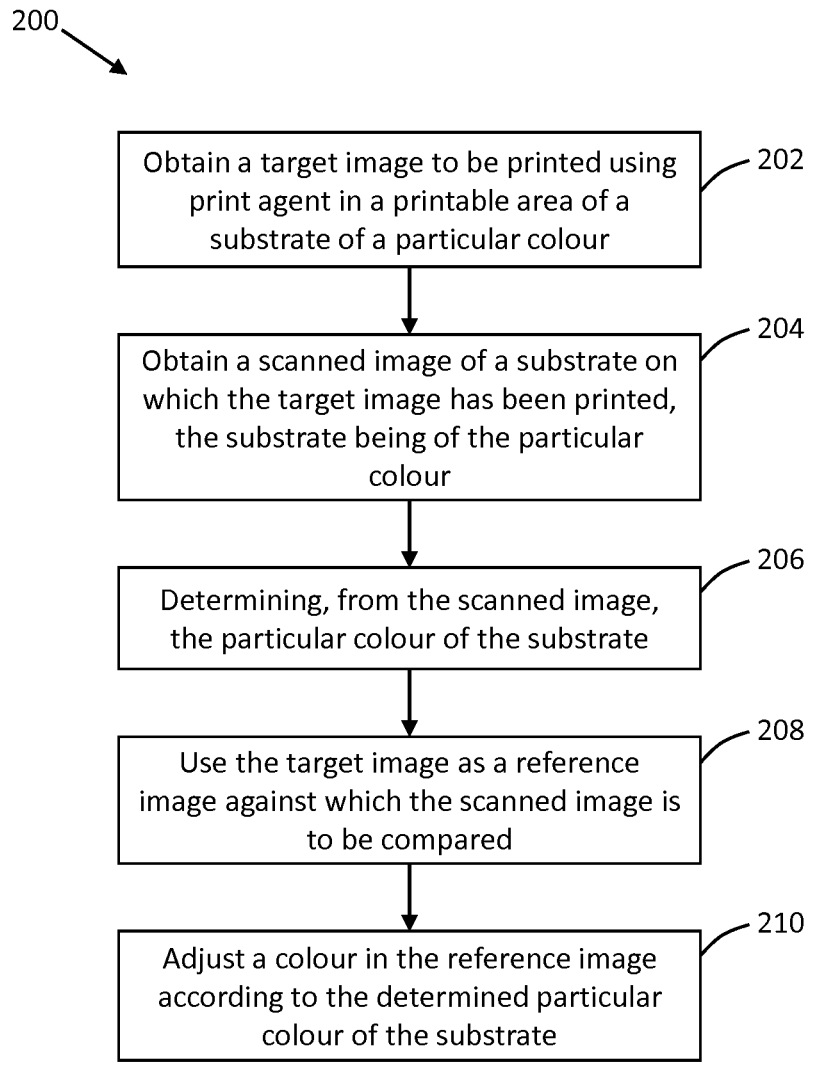
FIG. 2 is a flowchart of an example of a method of processing an image.

According to some examples, processing of the reference image 102 may be performed in accordance with a method. FIG. 2 is a flowchart of an example of a method 200 of processing a reference image. The method 200 comprises, at block 202, obtaining a target image to be printed using print agent in a printable area of a substrate of a particular colour. The target image may, for example, be in the form of image data contained within an image file. The printable area of the substrate a region of the substrate on which a print apparatus is capable of printing the target image. For example, the printable area may comprise an area separated from edges of the substrate by a margin. In some examples, the margin may constitute a non-printable area. The substrate may be of any colour. For example, the substrate may be white or another, non-white colour. However, as mentioned above, and as will be apparent from the following discussion, if the substrate is white, then no adjustment of the colours of the reference image may take place.

The method 200 comprises, at block 204, obtaining a scanned image of a substrate on which the target image has been printed, the substrate being of the particular colour. Thus, after the target image has been printed onto the substrate, for example using the printing system 100 discussed above, a scanning system may be used to scan the printed substrate.

At block 206, the method comprises determining, from the scanned image, the particular colour of the substrate. Determining the colour of the substrate maybe achieved in various ways. For example, the method may involve determining an area of the scanned image that corresponds to an unprinted area (i.e. an area in which, according to the target image, no print agent is intended to be delivered onto the substrate) and determining the colour in that area. In some examples, as noted above, the target image may be printed within a printable area of the substrate, and the substrate may include an area within which the target image is not to be printed. Thus, in some examples, determining the particular colour of the substrate may comprise measuring the particular colour of the substrate in a region outside the printable area of the substrate. This may achieved, for example, by sampling a region of the scanned image which corresponds to a region of the substrate which is outside the printable area, for example in the margin. In other examples, the substrate colour may be determined by sampling a colour at a different region of the substrate, for example a region within the printable region but where no print agent is to be deposited.

The target image to be printed onto the substrate constitutes the image that is intended to be printed. Thus, the target image may be compared to the printed image in order to identify defects. The method 200 may, therefore, comprise, at block 208, using the target image as a reference image against which the scanned image is to be compared.

At block 210, the method 200 may comprise adjusting a colour in the reference image according to the determined particular colour of the substrate. For example, if it is determined at block 206 that the substrate on which the target image is printed is a particular shade of red, then the colour of those portions of the reference image that correspond to areas where no print agent to be distributed onto the substrate may be adjusted to match the particular shade of red. In other words, a background colour of the reference image may be adjusted to match the colour of the substrate. In this way, when a comparison of the processed (i.e. colour-adjusted) reference image and the scanned image is performed, a print defect will not be falsely identified simply due to a difference in the background colour of the reference image compared to the background colour (i.e. the substrate colour) in the scanned image. In some examples, the processing of the reference image may include adjusting a colour in the image which is not the background colour. In other words, the processing (i.e. the colour adjustment of block 210) may involve adjusting a colour of a portion of the reference image which corresponds to an area on the substrate onto which print agent is to be printed. For example, to print a portion of the reference image which is blue in colour, blue print agent may be delivered onto the substrate. If blue print agent is delivered onto a white substrate, then the print agent appears blue, and matches the corresponding colour in the reference image. However, if blue print agent is delivered onto a red substrate, then the print agent may appear a different colour, due to its combination with the colour of the substrate. For example, the blue print agent may appear purple on a red substrate. Thus, a comparison of a scanned image (containing, for example, a purple region resulting from the blue print agent on the red substrate) with the reference image (containing a corresponding region which is blue) might result in a false print defect signal, due to the difference in colour. Therefore, the blue colour in the reference image may be adjusted by blending or mixing with it an amount of the particular shade of red identified as the substrate colour. In this way, the adjusted colour in the reference image (which may, for example, be purple) may correspond to the colour expected to result from the blue print agent being printed onto the red substrate.

The colour adjustment process may be performed differently for different parts of the reference image.

Figure 3:
FIG. 3 is a flowchart of a further example of a method of processing an image.

FIG. 3 is a flowchart of a further example of a method 300 of processing an image. The method 300 may include processes shown in the blocks of the method 200. The method 300 may comprise, at block 302, generating a plurality of masks from the target image. A mask may, in this context, be considered to be a portion, section or area of the target (i.e. reference) image. Adjusting (block 210) a colour in the reference image may comprise adjusting a colour or colours in each of the plurality of masks independently. For example, a colour or colours in a first mask in the plurality of masks may be adjusted in a first manner, a colour or colours in a second mask in the plurality of masks may be adjusted in a second manner, and so on. In some examples, a colour or colours in a particular mask may not be adjusted. Thus, within a reference image, some colours or parts of the image may be adjusted while other colours or other parts of the image may be adjusted to a different extent, or not adjusted at all.

Figure 4:
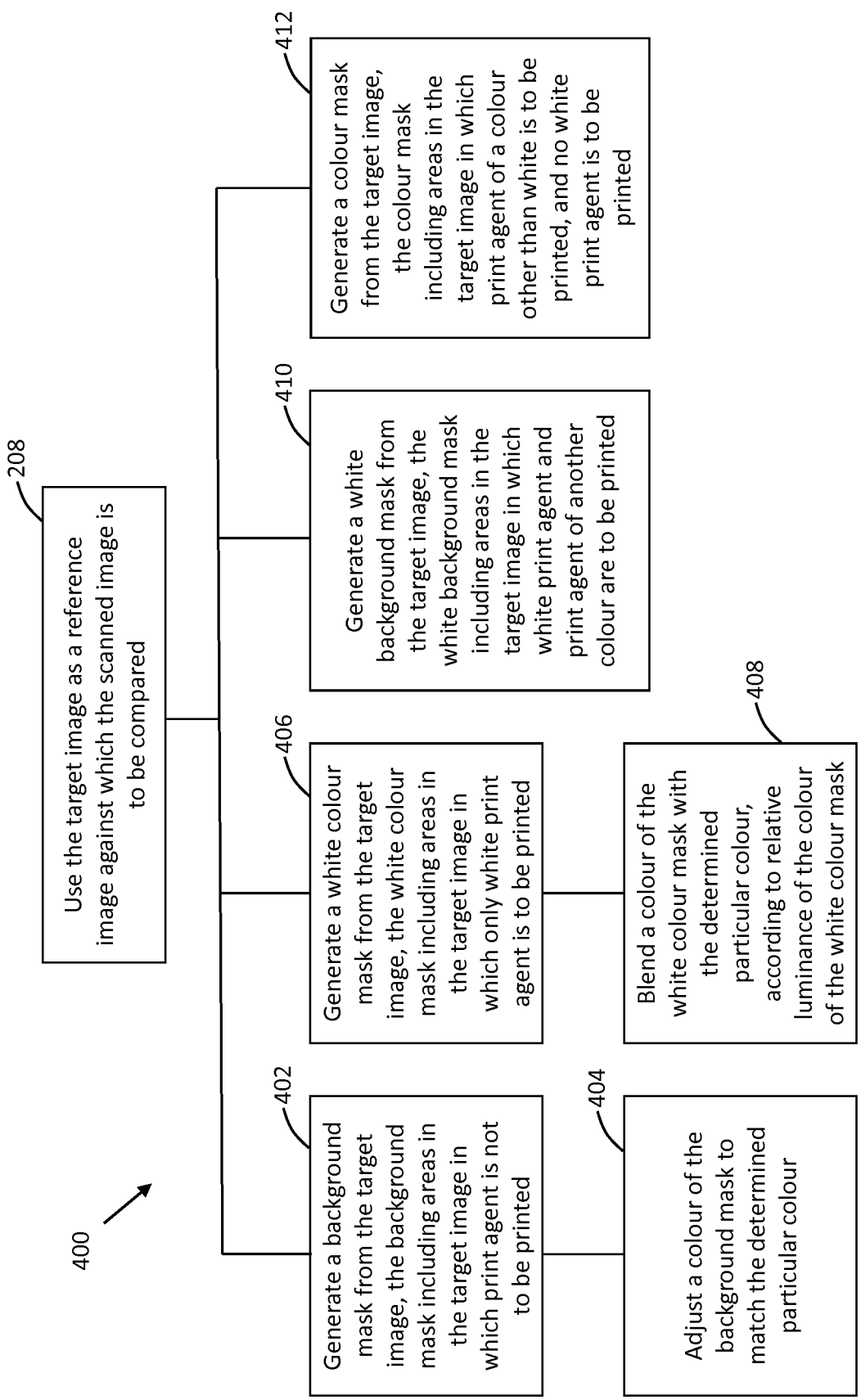
FIG. 4 is a flowchart of a further example of a method of processing an image.

FIG. 4 is a flowchart of a further example of a method 400 of processing an image. According to some examples, the method 400 involves generating various masks. In some examples, colours in each mask are to be adjusted differently.

FIG. 4 includes the block 208, whereby the target image is used as a reference image against which the scanned image is to be compared. The other blocks (402 to 412) of FIG. 4 may be considered to be examples of processes performed as part of adjusting a colour in the reference image (block 210).

At block 402, the method 400 may comprise generating a background mask from the target image, the background mask including areas in the target image in which print agent is not to be printed. If the target image includes an image which does not fill the entire substrate on which the image is to be printed, then the background mask may comprise those areas within the printable area of the substrate where print agent is not intended to be printed. In other words, the background mask may include areas corresponding to parts of the image where the substrate will contain no print agent, or where no separation is to be transferred to the substrate.

If a background mask has been generated, then adjusting (block 210) a colour in the reference image may comprise, at block 404, adjusting a colour of the background mask to match the determined particular colour. In other words, as described above, the background colour of the reference image (which, for example, may be white, or may be assumed to be white), may be adjusted to match the particular colour of the substrate determined in block 206.

At block 406, the method 400 may comprise generating a white colour mask from the target image, the white colour mask including areas in the target image in which just white print agent is to be printed. In other words, the white colour mask may include areas corresponding to regions where a white separation, and not a separation of any other colour, is to be transferred to the substrate. The white colour mask may also be considered to be a "white as foreground" mask, as the white colour in this mask is visible in the foreground of the target image. If the image were to be printed on a white-coloured substrate, then white print agent (e.g. a white separation) would not be printed onto the substrate in the regions within the white colour mask.

If a white colour mask has been generated, then adjusting (block 210) a colour in the reference image may comprise, at block 408, blending a colour of the white colour mask with the determined particular colour, according to an intensity of the colour of the white colour mask. As noted above, a white separation transferred onto a non-white substrate may not appear as true white. The particular colour of the substrate may cause the white separation (i.e. the print agent) to take to appear as a mixture of white and the particular colour. Therefore, blending the white colour in the white colour mask with the particular colour of the substrate is intended to replicate the colour that the white separation will appear to on the non-white substrate. For example, a white substrate transferred onto a red substrate may appear pink, or as a faded red, rather than an intended deeper red.

The actual colour that appears when the white separation is transferred onto the non-white substrate depends on how opaque or transparent the white colour is in the target image. The opacity or transparency of the white colour may correspond to the intensity of the white colour in the mask. For example, a faint white colour may appear transparent, and such a white colour may be considered to have a low intensity. A faint white colour in the target image may, when printed on the non-white substrate, take on a substantial amount of the substrate's colour and, therefore, a relatively larger amount of blending may be performed to replicate or emulate the colour in the reference image. A strong white colour may appear opaque, and such a white colour may be considered to have a high intensity. A strong white colour in the target image may, when printed on the non-white substrate, take on relatively little of the substrate's colour and, therefore, a relatively smaller amount of blending may be performed to replicate or emulate the colour in the reference image. The intensity of the white colour may correspond to a relative luminance of the colour.

In some examples, the intensity of the colour of the white colour mask may be determined using an equivalent grayscale value for the colour of the white colour mask. Thus, the colour of a pixel in the white colour mask of the target image (i.e. the reference image) may be examined, and a grayscale value for the pixel may be determined. A solid white colour may correspond to a relatively high grayscale value, while a less solid (e.g. more transparent) white colour may correspond to a relatively low grayscale value.

Blending the particular colour of the substrate with the white colour of the white colour mask may, in some examples, be done using an adaptive alpha blend technique, where the value of alpha depends on the determined grayscale values. In other examples, other blending techniques may be used.

The method 400 may, at block 410, comprise generating a white background mask from the target image, the white background mask including areas in the target image in which white print agent and print agent of another colour are to be printed. In other words, the white background mask may correspond to areas in which a white separation is to be transferred onto the substrate, and then a separation of another, non-white colour is to be transferred onto the substrate on top of the white substrate. Since the white separation is transferred onto the substrate before the separation of another colour, the coloured (i.e. non-white) separation appears on the substrate having the same colour as the corresponding area in the target image. Therefore, in some examples, no colour adjustment is performed in respect of the colours in the white background mask.

At block 412, the method 400 may comprise generating a colour mask from the target image, the colour mask including areas in the target image in which print agent of a colour other than white is to be printed, and no white print agent is to be printed. In other words, the colour mask may correspond to areas in which a coloured (i.e. non-white) separation is to be transferred onto the substrate, and no white separation is to be transferred onto the substrate. The coloured (non-white) separation appears on the substrate having the same colour as the corresponding area in the target image. Therefore, in some examples, no colour adjustment is performed in respect of the colours in the colour mask.

Figure 5:
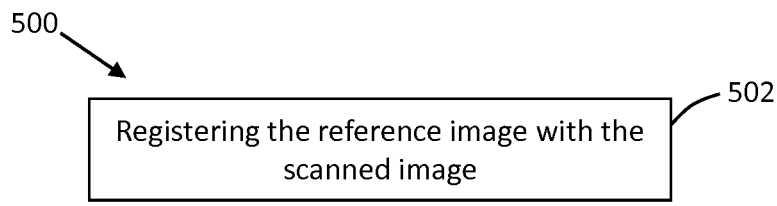
FIG. 5 is a flowchart of a further example of a method of processing an image.

FIG. 5 is a flowchart of a further example of a method 500 of processing an image. The method 500 may, in some examples, comprise, at block 502, registering the reference image with the scanned image. Registering the reference image and the scanned image may involve aligning the images with one another so that a subsequent comparison is accurate, and so that corresponding regions of the images are compared. Registration of the reference image and scanned image may be performed before any colour adjustment (at block 210) is performed. In some examples, the registration (block 502) is not performed.

The processing of the reference image may, in some examples, undergo a "fine-tuning" processing stage, whereby the colours of individual pixels in the reference image are adjusted to more closely match the intended colours appearing in the scanned image. Thus, for the fine-tuning processing, the colour adjustment may be performed on a pixels of the reference image based on a colour statistic (e.g. a mean and/or standard deviation) of particular colours (e.g. the red (R), green (G) and blue (B) colour channels or values) of pixels in the scanned image. For the additional processing performed in the fine-tuning colour adjustment, the colour adjustment of the background mask (block 404) is repeated, but, rather than adjusting the colour based on the colour of the substrate sampled from a region outside the printable area, the colour adjustment is performed on the basis of the colour of pixels in the scanned image which correspond to the mask in which the colour is being adjusted.

Figure 6:
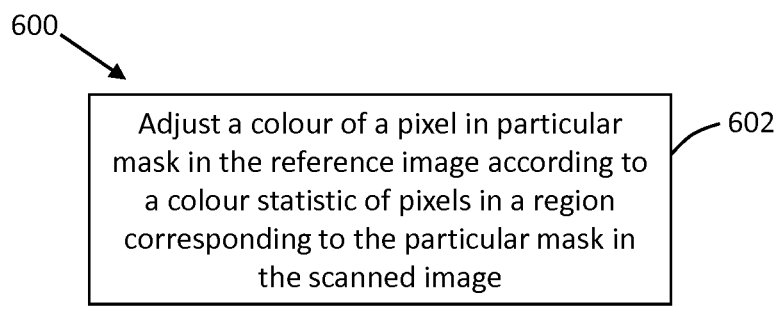
FIG. 6 is a flowchart of a further example of a method of processing an image.

FIG. 6 is a flowchart of a further example of a method 600 of processing an image. The method 600 may, in some examples, comprise, at block 602, adjusting a colour of a pixel in the reference image according to a colour statistic of pixels in the scanned image. In some examples, for a particular pixel in the reference image, the method may involve measuring a characteristic, or parameter, of a plurality of pixels (e.g. all of the pixels) in the scanned image. In some examples, the plurality of pixels may be in a particular mask in the scanned image which corresponds to the region in which particular pixel is located. In some examples, a mean of a value corresponding to the colour of pixels may be calculated. In some examples, a standard deviation of a value corresponding to the colour of pixels in the particular mask may be calculated. The calculated mean and/or standard deviation may be used to adjust the colour of the particular pixel or pixels in the reference image. In this way, the colour of a separation in in a particular mask in the scanned image may be more accurately matched to the corresponding colour in the reference image, so that a print defect may be more accurately detected, while lowering the likelihood that print defect will be falsely detected.

The colour adjustment of block 602 may be performed for pixels in any or all of the masks, such as the masks generated during blocks 402, 406, 410 and 412, as discussed above.

The following discussion demonstrates examples of the fine tuning process and, in particular, demonstrates how the colour of a pixel in the reference image may, in some cases, be adapted based on a colour statistic (which in this example comprises the mean and standard deviation) of colours of pixels in the scanned image.

Consider an example in which a reference image (referred to in this example as the "source image") includes an image in which 50% of the area to be printed is solid red and 50% of the area to be printed is solid blue. In such an example, the red, green and blue (RGB) values of pixels measured in the red portion of the reference image (i.e. the source image, or src) are $R_{src}=100$, $G_{src}=0$, and $B_{src}=0$. In contrast, the RGB values of pixels measured in the blue portion of the source are $R_{src}=0$, $G_{src}=0$, and $B_{src}=100$. In this example, the scanned image (referred to in this example as the "destination image", or dst) includes an image in which the colours appear approximately the same. Thus, the RGB values of pixels measured in the red portion of the destination image are the same as those measured in the red portion of the source image (i.e. $R_{dst}=100$, $G_{dst}=0$, and $B_{dst}=0$). Similarly, the RGB values of pixels measured in the blue portion of the destination image are the same as those measured in the blue portion of the source image (i.e. $R_{dst}=0$, $G_{dst}=0$, and $B_{dst}=100$).

Mean and standard deviation values are calculated for the RGB values over all of the pixels in the source image and over all of the pixels in the destination image. Thus, for the source image, the mean values are $R_{src\_mean}=50$, $G_{src\_mean}=0$, and $B_{src\_mean}=50$, and the standard deviation values are $R_{src\_std}=50$, $G_{src\_std}=0$, and $B_{src\_std}=50$. For the destination image, the mean values are $R_{dst\_mean}=50$, $G_{dst\_mean}=0$, and $B_{dst\_mean}=50$ and the standard deviation values are $R_{dst\_std}=50$, $G_{dst\_std}=0$, and $B_{dst\_std}=50$.

New RGB values for the source image (i.e. the reference image), $Src_{New}$, may be calculated for each R, G and B value using the equation:

$$Src_{New} = \left[(Src - Src_{mean}) \times \left(\frac{Dst_{std}}{Src_{std}}\right)\right] + Dst_{mean} \quad [1]$$

where Src is the R, G or B value of a particular pixel in the source image, $Src_{mean}$ is the mean value of the R, G or B values in the source image, $Dst_{std}$ and $Src_{std}$ are the standard deviations of the R, G or B values in the destination image and the source image, respectively, and $Dst_{mean}$ is the mean value of the R, G or B values in the destination image.

Applying equation [1] to the example above yields new R, G and B values for the red portion of the source image as $R_{Src\_new\_mean}=100$, $G_{Src\_new\_mean}=0$ and $B_{Src\_new\_mean}=0$ and new R, G and B values for the blue portion of the source image as $R_{src\_new\_mean}=0$, $G_{src\_new\_mean}=0$ and $B_{src\_new\_mean}=100$. Therefore, since the new values for R, G and B are the same as the measured values for the red and blue portions in the source image, the colours in the source image do not change. In other words, the colours in the source image and the destination image are already the same, so no modification is to be made.

In a second example, the source image is the same as the first example above and, therefore, the colours (i.e. the R, G and B values) of the source image are the same as for the example above. However, in this example, the destination image appears less bright and with colours which are not as rich. In this example, the red value of pixels measured in the red portion of the destination image is $R_{dst}=50$ (i.e. half the red value in the red portion of the source image) and the blue value of pixels measured in the blue portion of the destination image $B_{dst}=50$ (i.e. half the blue value in the blue portion of the source image).

Consequently, while the mean and standard deviation values calculated for the source image in this example are the same as those calculated in the previous example, for the destination image in this example, the mean values are $R_{dst\_mean}=25$, $G_{dst\_mean}=0$, and $B_{dst\_mean}=25$ and the standard deviation values are $R_{dst\_std}=25$, $G_{dst\_std}=0$, and $B_{dst\_std}=25$.

Applying these values to equation [1] above yields new R, G and B values for the red portion of the source image as $R_{Src\_new\_mean}=50$, $G_{Src\_new\_mean}=0$ and $B_{Src\_new\_mean}=0$, and new R, G and B values for the blue portion of the source image as $R_{Src\_new\_mean}=0$, $G_{Src\_new\_mean}=0$ and $B_{Src\_new\_mean}=50$. Thus, the colours in the source image are modified to match those of the destination image. In this way, the comparison between the source (i.e. reference) image and the destination (i.e. scanned) image can be performed more accurately, and slight differences in colours in the scanned printed image and the reference image do not cause a false identification of a print defect.

When generating masks in the reference image, a join or interface between adjacent masks may, in some examples, not be aligned, or may overlap. Such a mask overlap in a reference image may, when compared to the scanned image, lead to a false detection of a print defect. When comparing the reference image and the scanned image, a sensitivity at which the comparison is carried out may be selected. For example, at a relatively higher sensitivity, smaller print defects may be identified or detected from the comparison. At a relatively lower sensitivity, smaller print defects may not be identified or detected.

Figure 7:
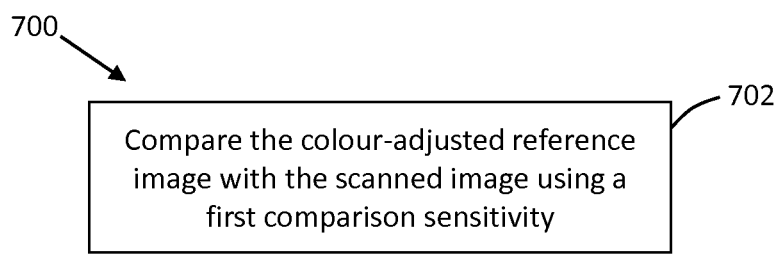
FIG. 7 is a flowchart of a further example of a method of processing an image.

FIG. 7 is a flowchart of a further example of a method 700 of processing an image. The method 700 may comprise, at block 702, comparing the colour-adjusted reference image with the scanned image using a first comparison sensitivity.

The comparison of the areas of the images that correspond to boundaries between the plurality of masks may be performed at a second comparison sensitivity, the second comparison sensitivity being lower than the first comparison sensitivity. In this way, there is less likelihood that a print defect will be falsely detected in a mask boundary region. As noted above, in such regions, overlaps between masks or other imperfections may appear in the reference image but not in the scanned image, so it is intended that such differences do not become falsely identified as print defects.

In addition to the method of processing an image, as described above, an apparatus for processing an image is also disclosed.

Figure 8:
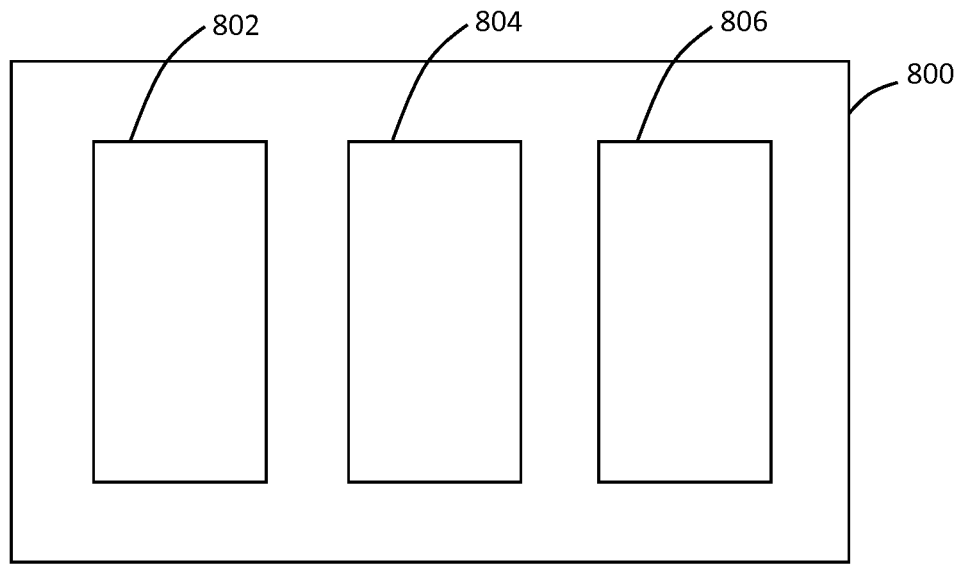
FIG. 8 is a simplified schematic of an example of an apparatus for processing an image.

FIG. 8 is a simplified schematic of an example of an apparatus 800 for processing an image. The apparatus comprises a target image input unit 802 to receive a target image to be printed using print agent in a printable area of a printable medium having a particular colour. The target image may be the reference image 102 discussed above. In some examples, the apparatus 800 may comprise a computing system. The apparatus may be associated with, part of, or within, a print apparatus.

The target image input unit 802 may, in some examples, comprise circuitry to receive image data which may, for example, be in the form of an image file.

The apparatus 800 comprises a captured image input unit 804 to receive a captured image of a printable medium on which the target image has been printed, the printable medium having the particular colour. The captured image input unit 804 may, in some examples, comprise an image scanning apparatus, or circuitry associated with a scanning system. A captured (e.g. scanned) image may be received in the form of image data.

The apparatus 800 comprises processing apparatus 806 to process image data. The processing apparatus 806 may, for example, perform processes discussed above, such as those discussed with reference to blocks 206, 208 and 210. In some examples, the processing apparatus 806 may be to establish, from the captured image, the particular colour of the printable medium. The processing apparatus 806 may be to use the target image as a reference image against which the scanned image is to be compared. The processing apparatus 806 may be to modify a colour present in the reference image according to the determined particular colour of the printable medium.

In addition to the apparatus 800 for processing an image, as described above, a machine-readable medium is also disclosed.

Figure 9:
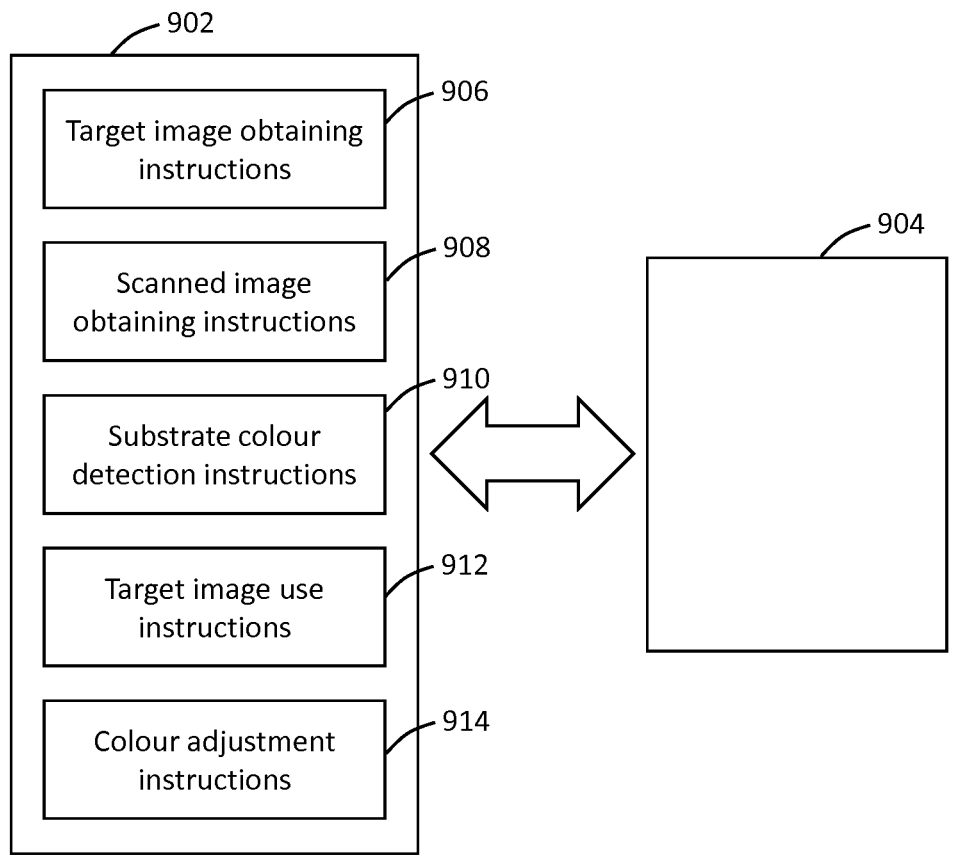
FIG. 9 is a simplified schematic of a machine-readable medium and a processor.

FIG. 9 is a simplified schematic of a machine-readable medium 902 and a processor 904. The machine-readable medium 902 comprises instructions which, when executed by the processor 904, cause the processor to perform the method 200 described above. The machine-readable medium 902 may comprise target image obtaining instructions 906 which, when executed by the processor 904, cause the processor to obtain a target image to be printed on a substrate of a particular colour. The machine-readable medium 902 may comprise scanned image obtaining instructions 908 which, when executed by the processor 904, cause the processor to obtain a scanned image of a substrate on which the target image has been printed, the substrate being of the particular colour. The machine-readable medium 902 may comprise substrate colour detection instructions 910 which, when executed by the processor 904, cause the processor to detect, from the scanned image, the particular colour of the substrate. The machine-readable medium 902 may comprise target image use instructions 912 which, when executed by the processor 904, cause the processor to use the target image as a reference image against which the scanned image can be compared. The machine-readable medium 902 may comprise colour adjustment instructions 914 which, when executed by the processor 904, cause the processor to adjust a colour in the reference image according to the determined particular colour of the substrate.

The machine-readable medium 902 may comprise further instructions which, when executed by the processor 904, cause the processor to perform other processes described herein.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method, comprising:
    obtaining a target image to be printed using print agent in a printable area of a substrate of a particular colour;
    obtaining a scanned image of a substrate on which the target image has been printed, the substrate being of the particular colour;
    determining, from the scanned image, the particular colour of the substrate;
    generating a white colour mask from the target image, the white colour mask including areas in the target image in which only white print agent is to be exclusively printed;
    using the target image as a reference image against which the scanned image is to be compared; and
    adjusting a colour in the reference image according to the determined particular colour of the substrate, wherein adjusting the colour in the reference image comprises blending a colour of the white colour mask with the determined particular colour.

2. A method according to claim 1, further comprising generating a plurality of masks from the target image;
    wherein adjusting a colour in the reference image comprises adjusting a colour in each of the plurality of masks independently.

3. A method according to claim 2, further comprising:
    adjusting a colour of a pixel in the reference image according to a colour statistic of pixels in the scanned image.

4. A method according to claim 1, further comprising generating a background mask from the target image, the background mask including areas in the target image in which print agent is not to be printed.

5. A method according to claim 4, wherein adjusting a colour in the reference image comprises:
    adjusting a colour of the background mask to match the determined particular colour.

6. A method according to claim 1, wherein the colour of the white colour mask is blended with the determined particular colour according to an intensity of the colour of the white colour mask.

7. A method according to claim 6, wherein the intensity of the colour of the white colour mask is determined using an equivalent grayscale value for the colour of the white colour mask.

8. A method according to claim 1, further comprising generating a white background mask from the target image, the white background mask including areas in the target image in which white print agent and print agent of another colour are to be printed.

9. A method according to claim 1, further comprising generating a colour mask from the target image, the colour mask including areas in the target image in which print agent of a colour other than white is to be printed, and no white print agent is to be printed.

10. A method according to claim 1, wherein determining the particular colour of the substrate comprises measuring the particular colour of the substrate in a region outside the printable area of the substrate.

11. A method according to claim 1, further comprising: registering the reference image with the scanned image.

12. An apparatus, comprising:
    a target image input unit to receive a target image to be printed using print agent in a printable area of a printable medium having a particular colour;
    a captured image input unit to receive a captured image of a printable medium on which the target image has been printed, the printable medium having the particular colour; and
    processing apparatus to:
    establish, from the captured image, the particular colour of the printable medium;
    generate a white colour mask from the target image, the white colour mask including areas in the target image in which only white print agent is to be exclusively printed;
    use the target image as a reference image against which the scanned image is to be compared; and
    modify a colour present in the reference image according to the determined particular colour of the printable medium, wherein to modify the colour present in the reference image, a colour of the white colour mask is blended with the established particular colour.

13. A non-transitory machine-readable medium comprising instructions which, when executed by a processor, cause the processor to:
    obtain a target image to be printed on a substrate of a particular colour;
    obtain a scanned image of a substrate on which the target image has been printed, the substrate being of the particular colour;
    detect, from the scanned image, the particular colour of the substrate;
    generate a white colour mask from the target image, the white colour mask including areas in the target image in which only white print agent is to be exclusively printed;
    use the target image as a reference image against which the scanned image can be compared; and
    adjust a colour in the reference image according to the detected particular colour of the substrate, wherein to adjust the colour in the reference image, a colour of the white colour mask is blended with the detected particular colour.

14. A method comprising:
    obtaining a target image to be printed using print agent in a printable area of a substrate of a particular colour;
    obtaining a scanned image of a substrate on which the target image has been printed, the substrate being of the particular colour;
    determining, from the scanned image, the particular colour of the substrate;
    using the target image as a reference image against which the scanned image is to be compared;
    generating a plurality of masks from the target image;
    adjusting a colour in the reference image according to the determined particular colour of the substrate, wherein adjusting a colour in the reference image comprises adjusting a colour in each of the plurality of masks independently; and comparing the colour-adjusted reference image with the scanned image using a first comparison sensitivity;

wherein comparison of the areas of the images that correspond to boundaries between the plurality of masks is performed at a second comparison sensitivity, the second comparison sensitivity being lower than the first comparison sensitivity.

* * * * *